May 2, 1950  W. L. HANSEN ET AL  2,505,961
SERVO UNIT AND MOTOR
Filed June 27, 1946  4 Sheets-Sheet 2
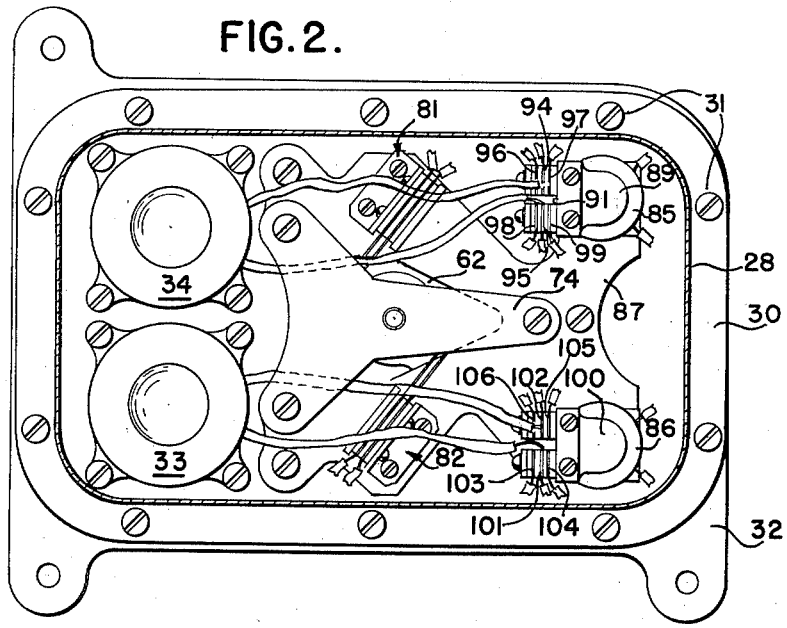
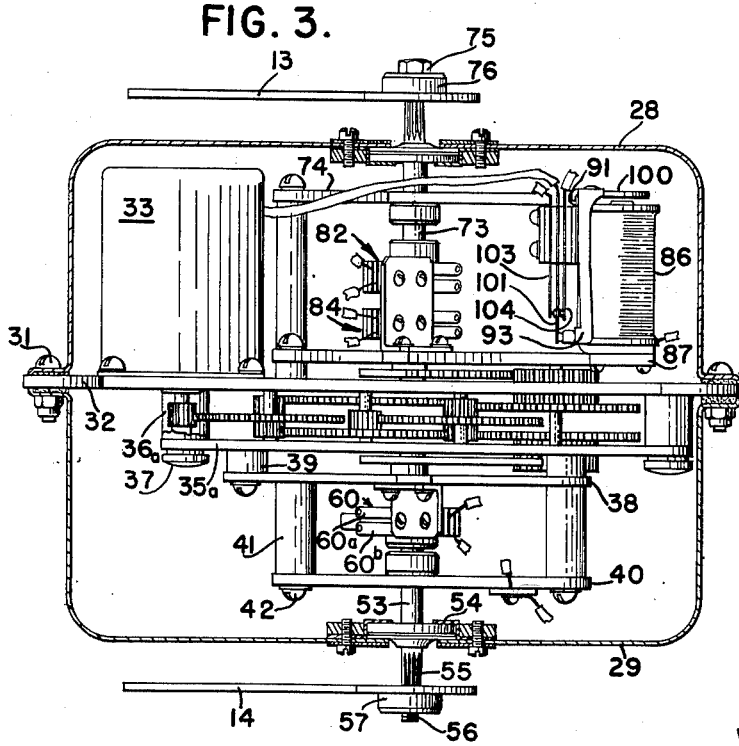
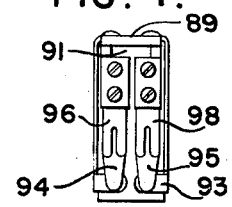
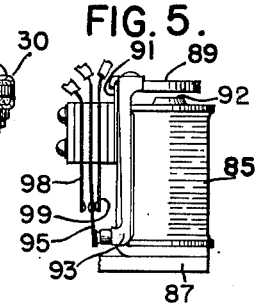
INVENTOR
WILLIAM L. HANSEN
BY IRA N. HURST
ATTORNEYS

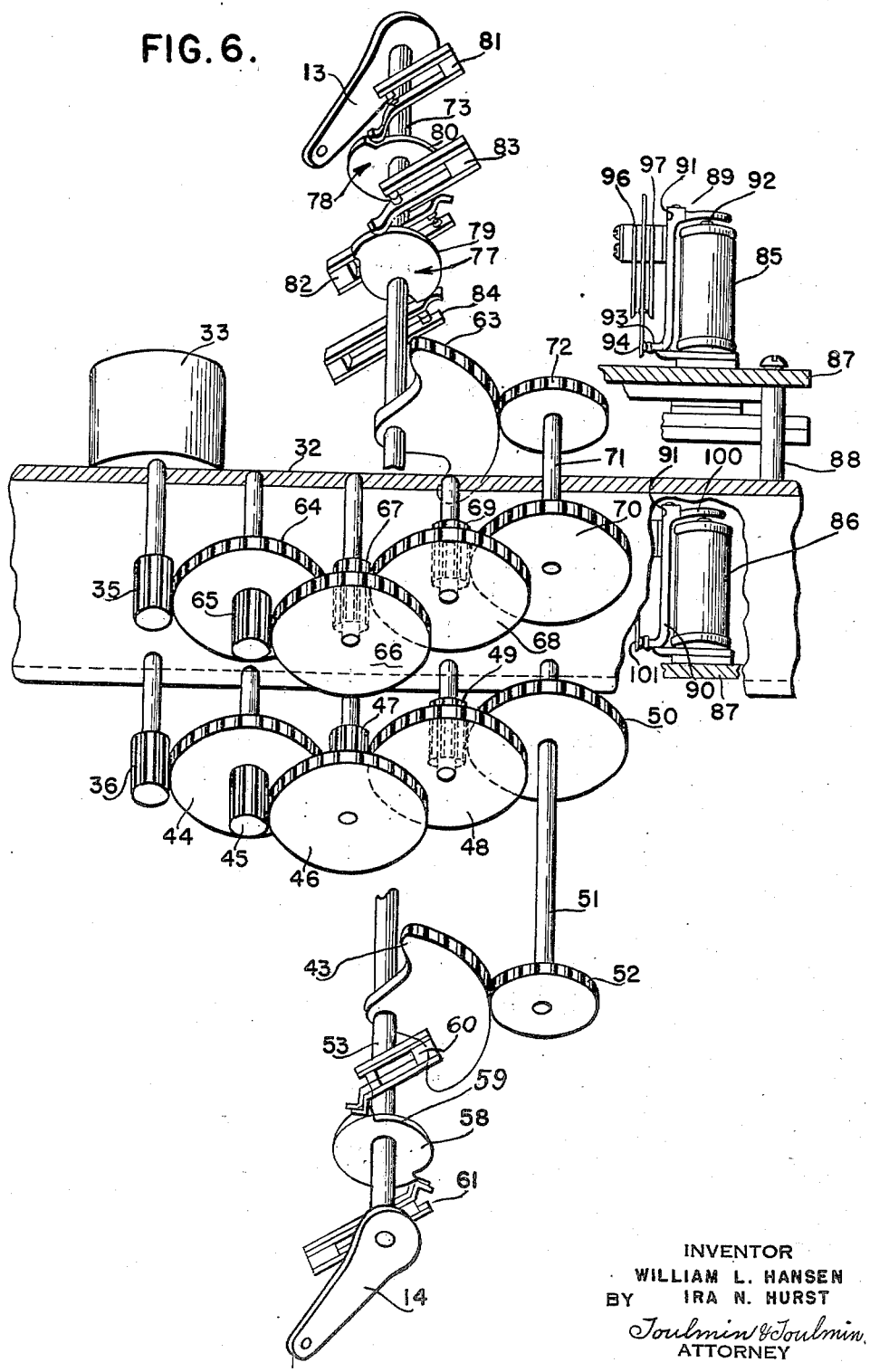

Patented May 2, 1950

2,505,961

UNITED STATES PATENT OFFICE 2,505,961

SERVO UNIT AND MOTOR

William L. Hansen and Ira N. Hurst, Princeton, Ind., assignors to Hansen Manufacturing Company, Inc., Princeton, Ind., a corporation of Indiana Application June 27, 1946, Serial No. 679,833

5 Claims. (Cl. 244—77)

The present invention relates to accessories for airplanes and more particularly to a servo unit for remotely controlling the elevating and steering surfaces of an airplane.

In many types of planes, direct mechanical connections are made between the operating stick and the various control surfaces of the plane, including the ailerons and rudder, and the force produced on these connections by the relative movement of air at the control surfaces is sometimes sufficiently great to cause physical strain on the operator or pilot. For this reason, among others, various types of servo units have heretofore been employed, many of which operate on the hydraulic pressure principle. The ways in which the various operating surfaces are interconnected are often quite complicated, tending to fall into disrepair and requiring considerable experience for efficient operation. Moreover, it is sometimes difficult for the pilot to bring the rudder instantly back to a straight flying course position after a steep bank, so that the operation of the plane becomes sluggish from the maneuverability standpoint.

The primary object of the invention is to provide a compact, relatively inexpensive, but highly dependable unit for controlling the operation of an airplane.

Another object is to provide an improved unit, operable by remote control, for actuating the control surfaces of an airplane.

Still another object is to provide an improved form of actuator in which the rudder is readily brought back to center for a straight flying course after the plane has executed a bank.

A further object is to provide an improved form of actuator for quickly setting a plane on the direct flying course by straight rudder regardless of the direction and extent to which a bank had been executed.

Other objects and features will be apparent as the specification is perused in connection with the accompanying drawings in which:

Figure 2 is a top plan view looking into the interior of the actuator casing, the latter being broken away and showing the operating motors, cams, electromagnets and switches.

Figure 3 is an elevational view of the interior parts of the actuator and with the cover of the actuator broken away and sectioned to expose such parts.

Figure 4 is a detail view of one of the double pole or reversing switches.

Figure 5 is a detail view showing the electromagnet for operating one of the switches as shown in Figure 4. This figure also illustrates the means by which the switch is mounted directly on the relay or electromagnet unit.

Figure 6 is an isometric fragmentary view somewhat distorted for clearness and showing the gear trains and the relation between the various switches, cams and operating relays of the improved actuator.

Figure 1:
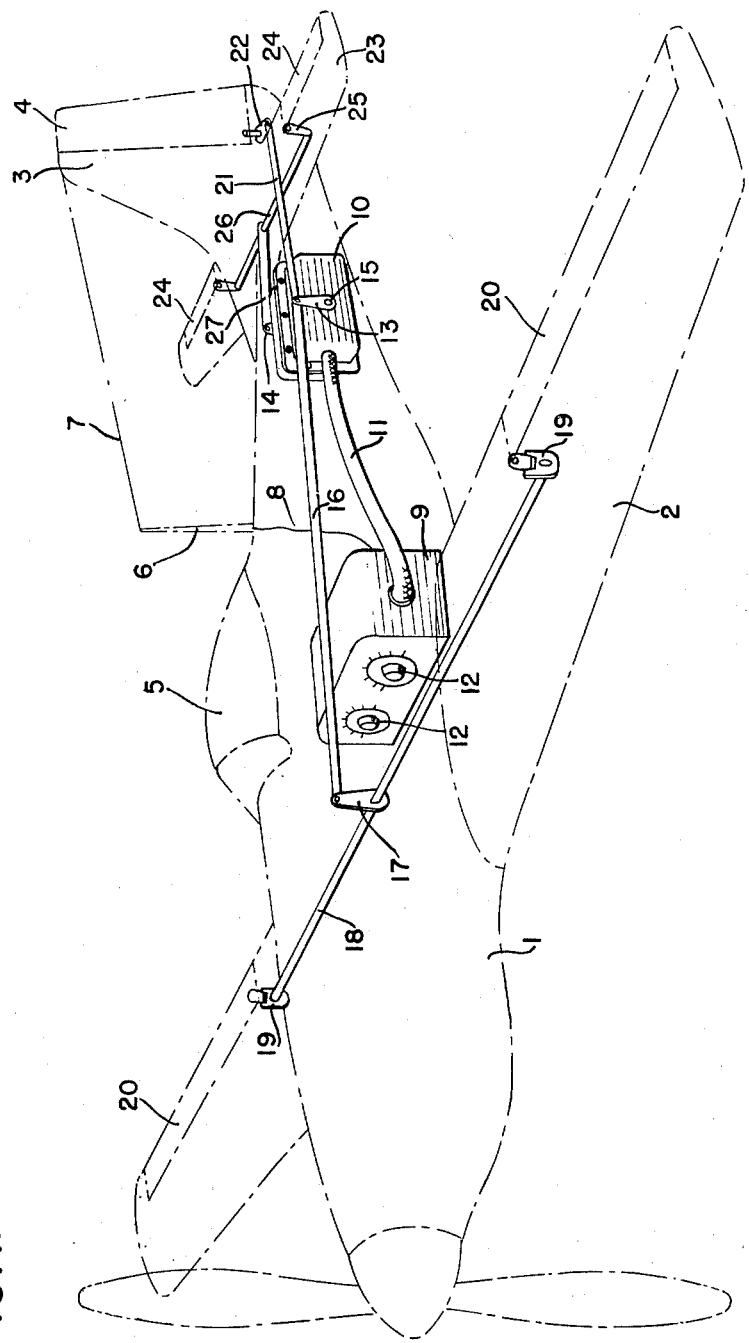
Figure 1 shows in perspective, and partly diagrammatic, an airplane provided with the improved form of actuator and its remote control panel.

Referring more particularly to Figure 1, reference character 1 designates the fuselage of an airplane, the airfoils of which are indicated at 2. The body of the plane terminates in a tail 3 to which a rudder 4 is swively connected in the usual manner. The body of the plane may include a cockpit 5 for a pilot, although as will be explained hereinafter the improved actuator is well suited for radio control, in which case no pilot would be necessary. In the latter event, an antenna mast 6 may be provided and an antenna 7 stretched between the mast and a suitable position on the tail. A leading conductor 8 is taken from the antenna to a box or casing 9 containing a highly sensitive receiving circuit of any suitable and well known type. The radio set contains relays (not shown) operable by the radio signals within the assigned wave length band. These relays are for the purpose of opening and closing circuits leading to the improved actuator 10 through the cable 11. The general arrangement is such that when the proper signals are received the relays within the box 9 will charge or discharge one or more of the various conductors passing through the cable 11 and leading into the actuator casing 10. It is apparent that, if desired, a pilot sitting in the cockpit 5 may also operate the relays by manually turning one of the dials 12. The actuator 10 is provided at each side with levers 13, 14 which are adapted to swing about the pivots 15. A connecting rod 16 extends between the upper end of the lever 13 and the upper end of an arm 17 which is attached to a rod 18 spanning the body of the plane. The rod 18 is connected through suitable linkage at 19 at each end for swingably moving the ailerons 20 in a differential manner when the arm 17 is rotated. A connecting rod 21 extends rearwardly from the lever 13 to a lever 22 on which the rudder 4 is swingably mounted. Thus, when the rod 21 is moved to the right or left, the rudder 4 is swung in a vertical plane.

It is apparent from the foregoing that as the lever 13 is swung to the left or right about its vertical axis, the ailerons 20 are moved in different directions to cause the plane to make a right or left bank and the rudder 4 is also moved in the proper direction to complete the banking operation.

Constituting part of the tail assembly there is a relatively horizontal airfoil member 23 to which elevating members 24 are swingably secured. These members are operated by a pair of arms 25 which are interconnected through a rod 26 and the latter is swivelly joined to the arm 14 through an operating rod 27. Thus, as the arm or lever 14 is swung right or left the elevating foils 24 are moved upwardly or downwardly.

The levers 13, 14 are operated by separate motors within a casing and when actuated, control the banking and elevating mechanism of the plane. The motors are under the separate and individual control of relays contained within the box 9 which may be operated through radio signals or by the pilot as by turning one or both of the dials 12. Accordingly, complete control of all the flying conditions of the airplane is obtained by operating one or both of the levers 14, 13 and the plane can be made to rise from the ground or to descend, or may be caused to make a right or left bank, and controlled by current transmitted through the cable 11 from the control box 9 which may be radio or manually operated.

The present invention is concerned more especially with the general design and details of the actuator 10, more particularly from the standpoint of providing an improved form of mechanism, both electrically and mechanically operated, by which the connecting rods 16, 21 and 26 are caused unfailingly to be moved in the right direction and in the proper amounts to give complete and accurate control of the airplane in operation.

Figures 2 to 6 show the details of the improved actuator. The actuator or servo unit is contained preferably in a pair of deep drawn housings 28, 29 having peripherally extending flanges 30 about their edges and joined together by a number of screws 31, with a central plate 32 interposed between the housings at the joint. This plate extends transversely across the double housing unit and serves as a support for practically all of the contained mechanism. There is a pair of electric motors 33, 34 secured to the plate 32, the lower of the two motors as shown in Figure 2 serving to actuate the lever 13 (Figure 1) through a train of gears as will be described presently and the motor 34 serves to operate the arm 14 through another set of gears. As shown in Figures 3 and 6, each set of gears which engage the pinions 35, 36 respectively of the motors 33, 34 are journalled at one end in the division plate 32 and at the other end in a support plate 35a. The latter may be secured to the plate 32 through spacing collars 36a and screws 37. There is a sub-plate 38 spaced from the main plate by collars 39 and a terminating plate 40 positioned away from the sub-plate 38 by spacers 41 and screws 42. The pinion 36 causes a segmental gear 43 (Figure 6) to swing through a limited arc by means of a gear and pinion train. This train starts with a pinion 36 which meshes with a gear 44 carrying a pinion 45. The latter engages gear 46 on which pinion 47 is mounted. The latter engages gear 48 which carries pinion 49 and the latter engages gear 50 which is mounted on shaft 51 and carries at the other end gear 52 which engages segmental gear 43. There is a shaft 53 mounted at one end in the sub-plate 38 and at the other end in the terminal plate 40, this shaft extending through an oil and dust proof bearing 54 in the housing 29 to receive the lever 14. The latter may be adjustably located on the shaft by means of longitudinally extending flutes 55 and the shaft is provided with threads 56 for receiving a locking nut 57. The fluted portion of the shaft is preferably tapered so that as the nut 57 is tightened, the lever 14 is caused to be rigidly secured to the fluted end of the shaft in the set position. The shaft 53 also carries a cam 58 preferably of fiber and provided with a cutaway portion 59. There is a double prong switch 60 bearing against the peripheral surface of the cam 58 (Figure 7) and on the other side of the cam there is a similar form of switch 61 also bearing against the cam. The two sets of switches 60, 61 may be conveniently secured to the sub-base 38 and the latter is cut away as indicated at 62 in Figure 2 to provide clearance for the cam 58. It will be apparent from Figure 6 that as the pinion 36 is rotated, the rotary motion is transmitted through the gears to cause the segmental gear 43 to swing in one direction or the other and to open and close either one of the switch sets 60, 61. The lever 14 will also be caused to swing to the right or left depending on the direction in which the pinion 36 is rotated.

As stated hereinbefore, there is a second gear train positioned between the support plate 35 and the main plate 32. This gear train connects the pinion 35 of the motor 33 to the segmental gear 63 which serves to swing the arm 13 back and forth. This last mentioned gear train is constituted of a gear 64 which carries a pinion 65, the latter meshing with gear 66 which carries a pinion 67. The last mentioned pinion engages gear 68 which carries a pinion 69 and the latter engages gear 70. The gear 70 is connected through shaft 71 to the gear 72 which engages the segmental gear 63. The last-mentioned gear is mounted on a shaft 73 which is journalled at one end in the plate 32 and at the other end is carried by a triangular support plate 74 (Figure 2). The outer end of the shaft 73 terminates in a tapered fluted portion similar to the shaft 53 for receiving the arm 30. The latter is secured in position by means of a nut 75 which is received by a threaded portion at the end of the shaft. Washers 76 and 57 may be interposed between the nut and lever at the outer ends of each of the shafts 73 and 53.

There is mounted on the shaft 73 a pair of cams 77, 78 having cutaway portions 79, 80, respectively. There are two double pronged switches 81, 82 bearing against the cam 78. A similar set of double pronged switches 83, 84 bear against the cam 77. There is also supported from the upper or motor side of the supporting plate 32, as seen in Figure 6, a pair of electromagnets 85, 86 which are carried on a plate 87 (Figure 6), spaced from the main plate 32 by the members 88. There is an angular shaped armature 89, swingingly mounted at 91, associated with the electromagnet 85 and responsive to the magnetic effects of the core 92. This armature extends downwardly for the length of the electromagnet and is terminated by a curved portion 93 which is in physical engagement with a pair of elongated leaf springs 94, 95. The spring 94 is contained between a pair of leaf springs 96, 97 insulatingly supported from the angular member 89. The leaf spring 95 is contained between a pair of leaf springs 98, 99, also supported from the armature 89. The elements of each pair of springs 96, 98 and 97, 99, also 94, 95, may be arranged edgewise to one another and insulatingly supported on a common mount as indicated in Figure 4.

Figure 7:
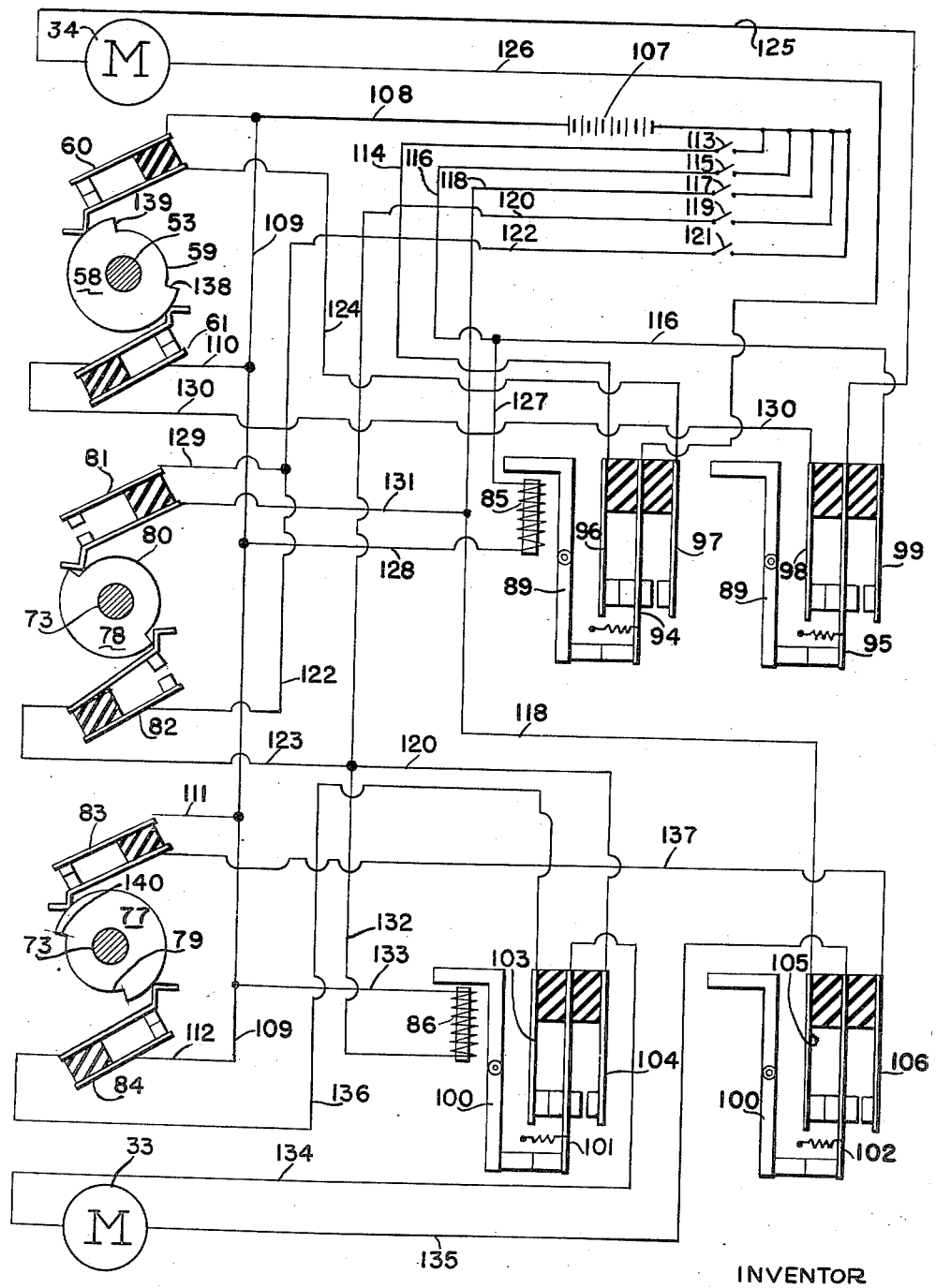
Figure 7 is a schematic view of the circuit employed in the improved actuator.

The adjacent electromagnet 86, as seen in Figures 2 and 6, has associated with it an armature 100 which has a downwardly extending curved portion in physical contact with a pair of extended leaf springs 101, 102 (Figure 7). Spring 101 is positioned between a pair of leaf springs 103, 104 insulatingly supported from the armature 100 in any suitable manner. The leaf spring 102 is positioned between a pair of leaf springs 105, 106 which are also insulatingly supported from the armature 100. As an impulse is applied to the coil 85, the intermediate leaf springs 94, 95 are caused to break contact with the springs 96, 98 respectively (Figure 7) and make contact with springs 97, 99 respectively. Similarly, as the electromagnet 86 is energized the springs 101, 102 break contact with the springs 103, 105 respectively and make contact with the springs 104, 106.

*Circuit diagram (Fig. 7)*

The energizing current for the motors 33, 34 is obtained from a direct current, low voltage battery 107. The positive terminal of that battery is connected to the upper pole of the switch 60 through a conductor 108. A wire 109 is taken from the conductor 108 and the lower pole of switch 61 is connected to the wire through conductor 110. A conductor 111 extends from the upper pole of the switch 83 to the conductor 109 and a conductor 112 connects between the lower pole of the switch 84 and the conductor 109. The negative side of the battery 107 is connected through a switch 113 to conductor 114, also through a switch 115 to conductor 116, through a switch 117 to a conductor 118, through a switch 119 to a conductor 120 and finally through a switch 121 to a conductor 122. The conductor 114 connects with the leaf spring 96 and the conductor 116 connects with the leaf spring 99. The conductor 118 connects with the leaf spring 105 and conductor 120 connects with the leaf spring 104 while the conductor 122 connects with the lower pole of the switch 82. A conductor 123 is taken from the conductor 120 to the upper pole of the switch 82. A conductor 124 connects between the lower pole of the switch 60 and leaf spring 97. A conductor 125 is taken between the motor 34 and the intermediate spring 95, while a conductor 126 is connected to the intermediate spring 94. The electromagnet 85 is electrically connected to the conductor 116 and conductor 109 through the conductors 127, 128 respectively. A conductor 129 is connected between the conductor 122 and the upper pole of the switch 81. A conductor 130 is connected between the upper pole of the switch 61 and the leaf spring 98. The lower pole of the switch 81 is connected through a conductor 131 to the conductor 118. The electromagnet 86 is connected to the conductor 120 through a conductor 132 and is connected to the conductor 109 through the connection 133. A wire 134 is taken from the motor 33 to the intermediate leaf spring 101 and a wire 135 from the other side of the motor is taken to the other intermediate leaf spring 102. The upper pole of the switch 84 is connected through conductor 136 to the spring 103 and a conductor 137 is joined between the lower pole of the switch 83 and the leaf spring 106.

Assume that the cams 58, 78 and 77 have the relative positions on the shafts 53 and 73 respectively as shown and the various switches 60, 61, 81, 82, 83, 84 and the double pole or reversing switches 94, 95, 102, 101 are in the positions shown in the drawing. Let it be further assumed that it is desired to cant the elevators 24 (Fig. 1) upwardly at the rear edge so as to cause the plane to lift, switch 113 would be closed. A circuit can then be traced from the negative side of the battery 107 through switch 113, spring 96 to spring 94, conductor 126 through the motor 34, conductor 125, spring 95 to spring 98, conductor 130, switch 61, conductor 110 back to the positive side of the battery through conductors 109, 108. The motor 34 would rotate and in rotating would turn the cam 58 clockwise. The circuit through the motor will be completed as long as the spring tip of the switch 61 rests on the outer portion of the cam 58. The motor 34 will rotate the pinion 36 causing the arm 14 to swing through an arc which causes the elevators 24 (Figure 1) to raise. The motor will continue to run as long as the switch 113 is closed, but only so long as the spring tip on the switch 61 rests on the outer portion of the cam 58. Thus, the position of the jog 138 on the cam 58 determines the maximum distance over which the arm 14 will swing while the switch 113 will determine any shorter swinging distance.

In order to reverse the motor 34 so as to depress the elevators 24 as when it is desired for the plane to lose altitude, the switch 113 is opened and switch 115 is closed. A circuit is then established from the negative side of the battery 107 through switch 115, conductor 116 to electromagnet 85, conductor 128 and conductors 109 and 108 back to the positive side of the battery. When the electromagnet 85 is energized, the springs 94, 95 move to the right and close contacts with the springs 97 and 99 respectively. The circuit is completed by going through the spring 99 to spring 95, up through conductor 125 to motor 34 (which is in the opposite direction to the circuit traced hereinbefore), through conductor 126, spring 94, spring 97 through conductor 124, switch 60 back to the positive side of the battery 107. The maximum angular travel that the arm or lever 14 can make in this opposite direction will be determined by the position of the jog 139 on the cam 58 as it will be recalled that the cam at this time is turning counterclockwise. It is apparent that any intermediate angular distance can be obtained by simply opening the switch 115.

In case it is desired to bank the plane as when the ailerons 20 are to be moved in opposite directions and the rudder is to be turned to accommodate the direction of bank, the switch 117 is closed. A circuit is now established from the negative side of the battery 107 to switch 117, spring 105, spring 102, conductor 135, to the motor 33, conductor 134, spring 101, spring 103, conductor 136, switch 84, conductor 112 and conductors 109 and 108 back to the positive side of the battery. Assume that the motor 33 rotates in the counterclockwise direction under these conditions, in which case the maximum angular travel which the lever can make will be determined by the position of the job 140. By opening the switch 117 after any shorter time of duration, any desired intermediate angular travel of the arm or lever 13 may be obtained.

The motor 33 can be reversed in operation to cause the lever 13 to swing in the opposite direction by opening the switch 117 and closing the switch 119. In this case, a circuit through the electromagnet 86 can be traced from the negative side of the battery through switch 119, conductor 120, conductor 132, electromagnet 86, conductor 133 and conductors 109 and 108 back to the positive side of the battery. The electromagnet 86 upon being energized causes the springs 101, 102 to make contact with the springs 104 and 106 respectively. A circuit is then established for the motor 33 in the opposite direction by passing from the negative side of the battery through switch 119, conductor 120 to spring 104, spring 101, through the motor 33, spring 102, spring 106, switch 83 and conductors 109 and 108 back to the positive side of the battery. Thus, by closing either switch 117 or 119, the motor 33 can be operated in one direction or the other causing the arm or lever 13 to move in either desired direction and thus, to control the elevation or depression of the ailerons 20 and the corresponding movement of the rudder 4.

It is desirable to be able to return the rudder and ailerons to a central position to provide for straight line flight and this can be done by closing the switch 121. Inasmuch as the cam 78 will have been moved either in a clockwise or counterclockwise direction from that shown in the drawings when switch 117 or 119 had been previously operated, one or the other of the switches 81, 82 will now be closed. Assume that the cam 78 has been moved clockwise as when switch 119 had previously been closed, switch 81 is now closed so that a circuit can be traced from the battery through switch 121, switch 81, spring 105 to spring 102, through the motor 33, then conductor 134, spring 101 to 103, switch 84 (assuming that the tip end of the spring still made contact with the outer surface of cam 77) and thence back to the battery 107 through conductors 109 and 108. On the other hand, if it were desired to bring the rudder back to center after the switch 117 had been previously closed so that cam 78 would have moved counterclockwise and caused the closure of switch 82, the following circuit can be traced; starting with the battery 107, then through switch 121, switch 82, electromagnet 86 back to the battery through conductors 109 and 108. This will reverse the lower two switches and a circuit can now be traced for the motor from the negative side of the battery through switch 121, switch 82, spring 104 to spring 101 through the motor to conductor 135, spring 102 to spring 106, conductor 137 through switch 83 (assuming that this switch is on the outer surface of the cam 77) back to the battery through conductors 109 and 108. Thus, regardless of whether switch 117 or 119 had closed and then opened, the closure of switch 121 will always serve to bring back the rudder to center and cause the plane to fly directly ahead.

The switches 113, 115, 117, 119 and 121 may be contained in the box 9 (Figure 1) and these switches can conveniently be controlled by electromagnets (not shown) which are responsive to radio signals received from the antenna 7 or such switches may be controlled by the dials 12 and operated from a position in the cockpit 5.

From the foregoing, it is evident that we have disclosed an improved form of servo motor, all parts of which, except the circuit closing switches, are contained within a single casing which can be conveniently mounted in the fuselage of the plane. The levers 13, 14 are positioned on opposite sides of the servo unit and the motors for operating these levers and the control circuit are all contained within the unit. The parts of the servo unit including the gears, motors, switches and electromagnets, are supported from the central plate 32 so that these parts can be readily assembled and adjusted as a unit before placing the unit into its casing. The only parts that are exposed are the shaft extensions and the arms 13, 14 which are connected to the operating rods 16, 21, and 27. Many of the parts, including the gears, switches, electromagnets and motors are duplicates of one another so that the unit as a whole can be inexpensively made and compactly arranged. Since size and weight are of predominant importance in the case of airplanes, careful consideration was necessary to provide the most compact arrangement and smallness of parts, indeed, the dimensions of the casing which houses the elevator and the aileron control device, also the rudder centering mechanism may have dimensions of only 5″ long x 3″ wide x 3½″ deep.

It will be understood that we desire to comprehend within our invention such modifications as come within the scope of the claims and the invention.

Having thus fully described our invention, what we claim as new and desire to secure by Letters Patent is:

1. In a servo unit adapted for controlling the flight of an aircraft; a pair of electric motors, means drivingly connecting one of said motors with the bank and turn control surfaces of a craft and the other of said motors with the elevator surfaces of the craft, a pair of control circuits for each of said motors and each closable to energize the associated motor in a different direction of movement, limit switch means operable in each direction of movement of each of said motors to make the then active control circuit ineffective thereby to hold each of said motors at predetermined limits of movement thereof, a pair of auxiliary control circuits for said one motor for driving it in opposite directions, means responsive to movement of said one motor in either direction from its center position for making the one of said auxiliary control circuits effective which will return the said one motor to its center position, and a single switch means selectively operable for controlling said auxiliary circuits.

2. In a servo unit adapted for controlling the flight of an aircraft; a pair of reversible electric motors, means drivingly connecting one of said motors with the bank and turn control surfaces of the craft and the other of said motors with the elevator surfaces of the craft, first and second control circuits for each of said motors closable for operating the associated motor in opposite directions of movement, normally closed limit switch means in each of said control circuits, cam means connected for being driven by said motor and operable for opening said switches at predetermined limits of movement of said motors, first and second auxiliary control circuits for said one motor, normally open switch means in said auxiliary circuits, cam means driven by said one motor and operable upon movement of said one motor from a center position for closing the one of said last mentioned switches which will make the auxiliary circuit effective that will return the said motor to its center position, and a single control switch for controlling both of said auxiliary circuits.

3. In a servo unit adapted for controlling the flight of an aircraft; a pair of motors, means for drivingly connecting one of said motors with the bank and turn control surfaces of the craft and the other of said motors with the elevator surfaces of the craft, means for energizing either of said motors for operation in either direction, means for limiting the amount of movement of said motors in both directions, a separate control means for said one of said motors including means connected to said last named motor and responsive to the operation of said last named motor in either direction, and also including means selectively operable to return said one motor to a center position for adjusting the surfaces connected thereto to straight line conditions regardless of the position of the said one motor at the time of actuation of said selectively operable means.

4. In a servo unit adapted for controlling the flight of an aircraft; a pair of motors, means for drivingly connecting one of said motors with the bank and turn control surfaces of the craft and the other of said motors with the elevator surfaces of the craft, means for energizing either of said motors for operation in either direction, means for limiting the amount of movement of said motors in both directions, a separate control means for one of said motors including means connected to said last named motor and responsive to the operation of said last named motor in either direction, and also including means selectively operable to return said one motor to a center position for adjusting the surfaces connected thereto to straight line conditions regardless of the position of the said one motor at the time of actuation of said selectively operable means.

5. In a servo unit adapted for controlling the flight of an aircraft; a pair of motor means, means for drivingly connecting one of said motor means with the bank and turn control surfaces of the craft and the other of said motor means with the elevator surfaces of the craft, means for energizing either of said motor means for operation in either direction, means for limiting the amount of movement of said pair of motor means in both directions, a separate control means for one of said motor means including means connected to said last named motor means and responsive to the operation of said last named motor means in either direction, and also including means selectively operable to return said last named motor means to a center position for adjusting the surfaces connected thereto to straight line conditions regardless of the position of the last named motor means at the time of actuation of said selectively operable means.

WILLIAM L. HANSEN.
IRA N. HURST.

REFERENCES CITED

The following references are of record in the file of this patent:

UNITED STATES PATENTS

| Number | Name | Date |
|---|---|---|
| 1,334,615 | Kittredge | Mar. 23, 1920 |
| 1,904,801 | Plutino | Apr. 18, 1923 |
| 2,109,475 | Fanning | Mar. 1, 1938 |
| 2,397,475 | Dinga | Apr. 2, 1946 |
| 2,423,336 | Moseley | Jan. 1, 1947 |